United States Patent Office 3,135,588
Patented June 2, 1964

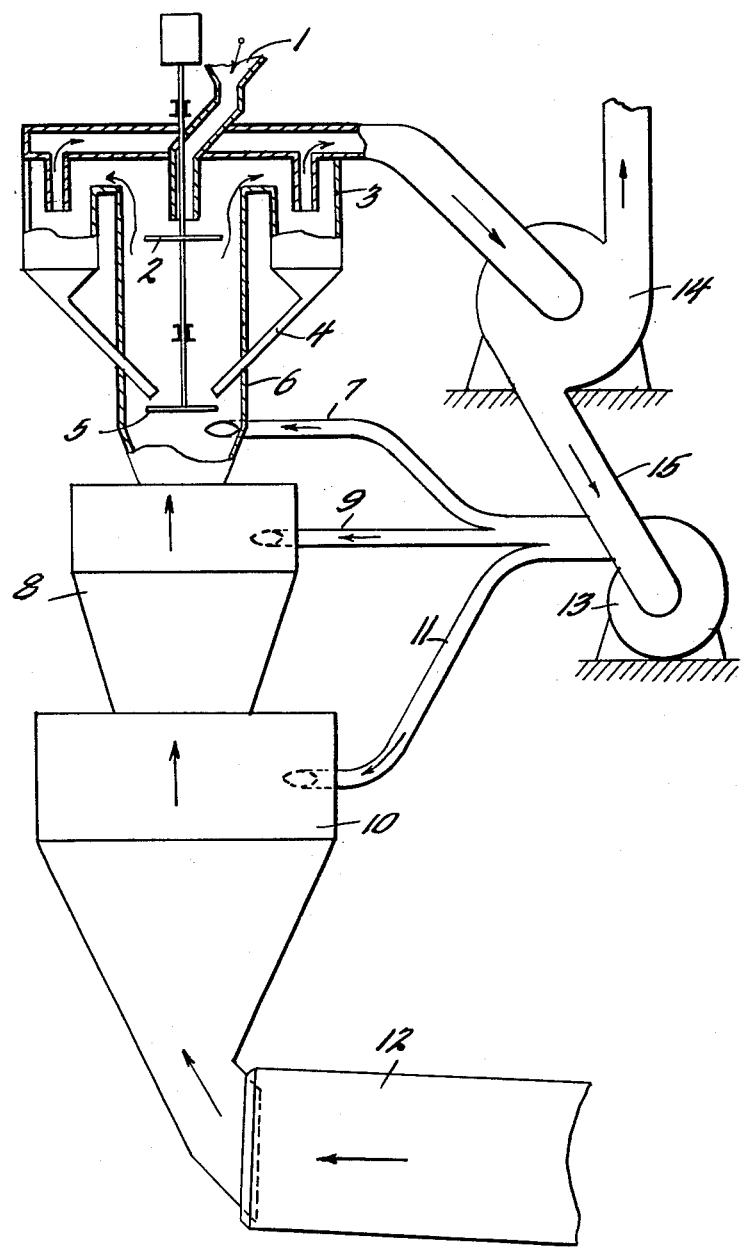

3,135,588
HEAT EXCHANGE OF GRANULAR MATERIAL IN A GASEOUS MEDIUM
Bernd Helming, An den Tannen 1, Neubeckum, Germany
Filed Mar. 31, 1958, Ser. No. 725,209
1 Claim. (Cl. 34—57)

This invention relates to an apparatus for heat exchange between a gaseous medium and a dust or granule medium for heating and cooling purposes.

It is an object of the invention that the dust or granular medium shall float in a gaseous or fluid medium whereby both mediums shall carry out a relative movement in counter flow as to the mediums.

In known methods heretofore practiced, the drawback is present that the fine dust-like medium is directed with difficulty counter to a stream of gas to attempt to produce counter flow streams of gas and dust or granule medii in order to provide an efficient heat exchange between the medium and the gases or fluids.

A further object of the invention resides in the process in which a counter stream principle is used with a part from a high operative counter stream, a simple and inexpensive apparatus is utilized which is operative with low energy expenditure. Another object of the invention resides in a method in which cylindrical hollow chambers are used in series in stepwise fashion with increasing or decreasing containers operative with a gaseous medium with the latter moving relatively slow from the bottom container through the series to the top container at the same time that the medium in fine and granular condition flowing in a counter stream. Experiments have shown that a dust-like medium having definite particle sizes, as for example, for producing Portland cement and other materials, a counter flowing of such cement and a gas is operative when the dust particles are directed or forced against the side walls as a thin layer by the gases.

Another object of the invention resides in the provision of a heat exchange container in which the gaseous fluid and the powder material flow as counter streams. The method according to the invention is particularly efficient in its operation and requires a minimum of heat expenditure.

A still further object of the invention resides in an apparatus arranged vertically as a single cylinder or a plurality of cylinders arranged stepwise with the smallest section at the top and provided with inner or outer insulation.

Further objects will be apparent from the following description when considered in connection with the accompanying drawing which is a diagrammatic side elevation of the complete apparatus for heat exchange of dust and granular materials.

The material in the form of a dust or granules is introduced into the hopper 1 as indicated by the arrow and it then flows through a trough or pipe and falls onto a centrifugal disc 2 in the form of a veil or curtain thereof in a gas or fluid stream. This material trickles or is sprayed partly into a shaft or tunnel therebelow or is entirely carried away by the gas stream and is received in a cyclone receiver where it is forced or flows down and is again directed into the gas stream through the passages 4. The channels 4 of the cyclone separator 3 terminates, for example, in and on a second centrifugal disc 5 by means of which the dust or powder material is directed anew in veil form into the gas stream. This results in an extremely thorough and controlled mixing of the material and the gas or fluid in the upper cylindrical heat exchanger 6. Below the shower of material, the latter subjected to a very high speed by means of a gas or fluid stream created by and from the tangential pipe connection 7 whereby the gas column rising upwardly as indicated by the arrows, is set in rotation. Thus the dust particles or granules are agitated and tend, by centrifugal force, to seek the walls of the container 6 and flow downwardly in spiral fashion into the second heat exchange cylinder 8.

At or near the point of entry in the second cylinder 8 there occurs a renewed mixing of the gas and the material in which the dust layer spirally enters the gas chamber 8 and a renewed heat exchange takes place. The tangentially connected pipe 9 directs a small amount of gas into the cylinder 8 at high speed whereby a renewed centrifugal rotation effect will result of the dust material preparatory to its entry into the next cylinder 10 in which the process of treatment is repeated. One can, if desired and necessary, provide further cylindrical containers connected in series for further treatment for as many times as desired. From the cylinder or space 10 the heated or cooled material will be expelled or will expel itself into a rotary kiln 12 which is subjected to the heat treatment from the gases of a suitable source. The amount of gas which traverses through the pipes 7, 9 and 11 is generated in any suitable manner and is under the force of a pump 13. This pump can draw the gas from the gas exhaust pump 14 by means of a pipe 15, as indicated by the arrows.

Other combinations are possible, as for example the pipe system which create the gas pressures may be connected to each individual compressor or pump which suitably draw the gas streams from the main gas supply to the places of application. Thus, for example, the partial stream can be taken from reentry places when it is desired that the main and partial gas streams shall have the same temperatures.

As shown on the drawing each unit 6, 8 and 10 has a frusto-conical portion.

Othter combinations are possible within the scope of the appended claim.

I claim as my invention:

An apparatus for the heat exchange in a counter stream between a powder or granular material particularly a cement and a gas, comprising an essentially cylindrical chamber vertically arranged, means at the top end of the chamber for delivery of the material and the chamber having an opening at the top through which gases are to be withdrawn, said chamber having an opening in the lower end of the chamber for exit of material and a gas entry means at the lower end of the chamber, a tangential opening in the chamber for creating a rotation of the gas in the chamber by tangentially forcing a small amount of gas into the chamber at high speed through said opening, at least one rotary disc provided in the chamber to receive the material thereon and centrifugally directed therefrom, the material forced along upwardly by the gases being treated by a cyclone separator to be returned into the chamber at a lower point.

References Cited in the file of this patent
UNITED STATES PATENTS

| | | |
|---|---|---|
| 556,129 | Barbeau | Mar. 10, 1896 |
| 1,459,326 | Dow | June 19, 1923 |
| 1,783,464 | Follain | Dec. 2, 1930 |
| 2,240,854 | Peebles | May 6, 1941 |
| 2,317,479 | Peebles | Apr. 27, 1943 |
| 2,361,940 | Hall | Nov. 7, 1944 |
| 2,435,424 | Crews | Feb. 3, 1948 |
| 2,435,927 | Manning et al. | Feb. 10, 1948 |
| 2,575,119 | Peebles | Nov. 13, 1951 |
| 2,578,315 | Parker | Dec. 11, 1951 |
| 2,663,560 | Muller et al. | Dec. 22, 1953 |
| 2,683,938 | Gustavsson | July 20, 1954 |
| 2,744,338 | Rothe | May 8, 1956 |
| 2,853,361 | Bryk | Sept. 23, 1958 |

FOREIGN PATENTS

| | | |
|---|---|---|
| 884,378 | France | Apr. 27, 1943 |
| 841,425 | Germany | June 16, 1952 |